Patented Aug. 4, 1925.

1,548,077

UNITED STATES PATENT OFFICE.

ROBERT LAUDER MACKENZIE WALLIS, OF LONDON, ENGLAND.

PRODUCTION OF ANTISEPTIC AND DISINFECTANT COMPOSITIONS.

No Drawing.   Application filed July 22, 1924.   Serial No. 727,571.

*To all whom it may concern:*

Be it known that I, ROBERT LAUDER MACKENZIE WALLIS, a British subject, and residing at 20 St. John's Wood Park, London, N. W. 8, England, have invented certain new and useful Improvements in and Relating to the Production of Antiseptic and Disinfectant Compositions, of which the following is a specification.

This invention relates to antiseptics and like disinfectant compositions, and has for its object to provide improvements therein.

The invention consists in the process of producing a disinfectant composition comprising bringing together thymol or an equivalent phenol and a derivative of furfurane and subjecting the mixture to oxidation.

Normally in accordance with the invention furfurol will be employed as this material is available commercially at a relatively low price.

In carrying the invention into effect, the mixture of thymol or equivalent phenol and a derivative of furfurane may be subjected to oxidation by means of free oxygen as such or in the form of ozone. Thus, the mixture may be subjected to the action of atmospheric oxygen or of air containing a proportion of ozone.

Hydrogen peroxide and ozonic ether are further examples of oxidizing agents suitable for use.

As the result of the oxidation an oily liquid of a reddish colour is formed, resembling in this respect and in certain of its other properties the material produced in the manner described in the specification of British Letters Patent No. 172993.

In other words, the product emulsifies with water and permanent emulsions adapted to be diluted to any convenient degree may be obtained by the employment, if necessary, of protective colloids or emulsifying agents, such as soap.

The composition possesses a low degree of toxicity and is thus suitable for use in the treatment of foodstuffs. Thus the material may be atomized and admixed with the air of chambers in which meat is stored.

Alternatively, the material in the form of an emulsion may be sprayed, brushed or otherwise applied to meat, or the meat may be dipped into the emulsions or the latter may be added to the pickle or liquor employed for curing the meat.

The emulsion may also be added to water which is thereafter frozen, the resulting ice being employed, for instance, in preserving fish or other materials which may be packed in contact with the ice.

Further, the composition may be employed in disinfecting houses, public carriages, places of entertainment, tube railways and other structure used by a number of people, by introducing the material in an atomized state either continuously or intermittently by way of the ventilating system or otherwise, and the invention extends to the use of the material in accordance with the invention for such purposes.

The following particulars are given by way of example to illustrate a suitable method of carrying the invention into effect:—

50 grammes of commercial thymol are brought together with 100 grammes of furfurol in the presence of oxygen or a suitable oxidizing agent, the action of the oxidizing agent being promoted by securing intimate contact between it and the mixture as, for instance, by bubbling air or other suitable oxygen-containing gas through the mixture, or by passing the mixture through a column through which air is caused to travel.

Having now described my invention, what I claim as new and desire to secure by Letters Patent is:—

1. The process of producing antiseptic, disinfectant or preservative compositions, which comprises bringing together thymol or like higher phenol, and a derivative of furfurane, and subjecting the mixture to oxidation.

2. An antiseptic, disinfectant or preservative composition comprising an oxidation product of a higher phenol and a derivative of furfurane.

In testimony whereof I have signed my name to this specification.

ROBERT LAUDER MACKENZIE WALLIS.